United States Patent
Yamakose et al.

(10) Patent No.: US 9,880,450 B2
(45) Date of Patent: Jan. 30, 2018

(54) DOCUMENT CAMERA

(71) Applicant: Elmo Co., Ltd., Nagoya-shi, Aichi (JP)

(72) Inventors: Hiroshi Yamakose, Nagoya (JP); Hiroshi Mameda, Nagoya (JP); Tetsuo Kato, Nagoya (JP); Yusuke Dohi, Nagoya (JP)

(73) Assignee: Elmo Co., Ltd., Nagoya-shi, Aichi (JP)

( * ) Notice: Subject to any disclaimer, the term of this patent is extended or adjusted under 35 U.S.C. 154(b) by 0 days.

(21) Appl. No.: 15/383,642

(22) Filed: Dec. 19, 2016

(65) Prior Publication Data
US 2017/0176843 A1 Jun. 22, 2017

(30) Foreign Application Priority Data

Dec. 22, 2015 (JP) ................................. 2015-249287
May 25, 2016 (JP) ................................. 2016-103867

(51) Int. Cl.
*G03B 37/02* (2006.01)
*G03B 17/56* (2006.01)
*H04N 5/225* (2006.01)

(52) U.S. Cl.
CPC ......... *G03B 17/561* (2013.01); *H04N 5/2252* (2013.01); *H04N 5/2254* (2013.01)

(58) Field of Classification Search
CPC ... G03B 17/561; H04N 5/2252; H04N 5/2254
USPC .................................................. 396/20, 431
See application file for complete search history.

(56) References Cited

U.S. PATENT DOCUMENTS

| 5,444,486 A * | 8/1995 | Mizuno ................. H04N 1/195 348/370 |
| 2005/0040298 A1* | 2/2005 | Ohki ..................... F16M 11/10 248/176.1 |
| 2007/0035655 A1* | 2/2007 | Chen ....................... H04N 1/04 348/373 |
| 2008/0062298 A1* | 3/2008 | Yen ...................... G03B 15/035 348/333.07 |
| 2010/0054721 A1* | 3/2010 | Hsieh ..................... F16M 11/08 396/5 |
| 2011/0134313 A1* | 6/2011 | Kato ....................... G03B 17/54 348/373 |

(Continued)

FOREIGN PATENT DOCUMENTS

JP 2013-121051 A 6/2013

*Primary Examiner* — Rodney Fuller
(74) *Attorney, Agent, or Firm* — Muncy, Geissler, Olds & Lowe, P.C.

(57) ABSTRACT

A document camera includes a base, a first arm assembled to the base, a second arm assembled to the first arm, and a camera head assembled to the second arm. The first arm is pivotable between a parallel extending position and a raised position. The second arm is pivotable between a juxtaposed position and a raised position and between the raised position and a parallel extending position. The camera head is pivotable between a juxtaposed position and a position where the camera head is raised from the second arm. When the document camera is to be folded, the first arm is set to the parallel extending position, the second arm and the camera head are to the respective juxtaposed positions. When the document camera has been folded, upper surfaces of the first and second arms and the camera head are substantially coplanar.

13 Claims, 31 Drawing Sheets

(56) References Cited

U.S. PATENT DOCUMENTS

| | | | |
|---|---|---|---|
| 2013/0148017 A1* | 6/2013 | Furusawa | H04N 5/2252 348/376 |
| 2013/0176483 A1* | 7/2013 | Shen | G03B 17/54 348/373 |
| 2015/0138432 A1* | 5/2015 | Takabatake | H04N 5/2256 348/370 |

* cited by examiner

DOCUMENT CAMERA

CROSS-REFERENCE TO RELATED APPLICATIONS

This application is based upon and claims the benefit of priority from the prior Japanese Patent Application Nos. 2015-249287 filed on Dec. 22, 2015 and 2016-103867 filed on May 25, 2016, the entire contents of both of which are incorporated herein by reference.

BACKGROUND

1. Technical Field

The present disclosure relates to a document camera which includes a base, an arm pivotally assembled to the base and a camera head mounted on a distal end of the arm and in which a material such as document, model or the like is imaged by the camera head and an obtained image is supplied to a monitor television or projected by a video projector onto a screen.

2. Related Art

Japanese Patent Application Publication No. JP-A-2013-121051 discloses one of conventional document cameras, which includes a base provided with an operation part, a first arm assembled to a central front end of the base so as to be pivotable in a front-back direction, a second arm assembled to a distal end of the first arm so as to be pivotable in the front-back direction and a camera head assembled to a distal end of the second arm so as to be pivotable in the front-back direction.

An arm housing recess is formed in a central part of the base in the above-described document camera. The first arm is pivotable between a laid position where the first arm is laid in the arm housing recess of the base and a raised position where the first arm is raised from the front end of the base to extend obliquely frontward. The second arm is pivotable between a laid position where the second arm is laid in the first arm and a raised position where the second arm is raised from the first position or a parallel extending position where the second arm extends forward in parallel to first arm. Furthermore, the camera head is pivotable between a raised position where the camera head is raised from the second arm and a parallel extending position where the camera head extends forward in parallel to the second arm.

When the document camera is not in use, the first arm is laid in the arm housing recess, and the camera head and the second arm are laid in the first arm with the camera head being located at the parallel extending position. The document camera is thus foldable. In the folded state of the document camera, upper surfaces of the second arm and the camera head are coplanar with an upper surface of the base.

In the above-described conventional document camera, the first and second arms are housed in the arm housing recess while placed vertically one upon the other. As a result, the document camera has a difficulty in reducing a thickness thereof when folded.

Furthermore, when the document camera in the folded state is set into an application mode, it cannot be determined at a glance which one the ends of the second arm and the camera head substantially coplanar with the upper surface of the base should be grasped and pivoted clockwise or counterclockwise, with the result that the document camera has a low usability

SUMMARY

Therefore, an object of the disclosure is to provide a document camera in which the thickness and the width thereof can be rendered as small as possible when folded and the camera head can easily be set and which can easily folded.

The present disclosure provides a document camera including a base, a first arm assembled to a front end of the base so as to be pivotable in a front-back direction, a second arm assembled to a distal end of the first arm so as to be pivotable in the front-back direction and a camera head assembled to a distal end of the second arm so as to be pivotable in the front-back direction. The first arm is pivotable between a parallel extending position where the first arm extends forward from the front end of the base in parallel to the base and a raised position where the first arm is raised upward from the front end of the base. The second arm is pivotable between a juxtaposed position where the second arm is juxtaposed to the first arm and a raised position where the second arm is raised from the first arm. The second arm is further pivotable between the raised position and a parallel extending position where the second arm extends forward from the first arm in parallel to the first arm. The camera head is pivotable between a juxtaposed position where the camera head is juxtaposed to the second arm and a position where the camera head is raised from the second arm. When the document camera is to be folded, the first arm is set to the parallel extending position, the second arm is set to the juxtaposed position and the camera head is set to the juxtaposed position. When the document camera has been folded, an upper surface of the first arm, an upper surface of the second arm and an upper surface of the camera head are substantially coplanar. The first arm is provided with a second arm housing recess in which the second arm is housed. The second arm is provided with a camera head housing recess in which the camera head is housed. When the document camera has been folded, the second arm is laid in the second arm housing recess, and the camera head is laid in the camera head housing recess.

According to the above-described document camera, when the document camera is to be folded, the second arm is laid in the second arm housing recess of the first arm extending forward from the front end of the base, and the camera head is laid in the camera head housing recess of the second arm. Accordingly, the base and the first and second arms do not overlap one another up and down. Furthermore, sides of the base and the first and second arms do not overlap one another right and left. Accordingly, the width of the document camera can be rendered as small as possible when the document camera is to be folded, and the document camera can be folded into a flat shape.

DETAILED DESCRIPTION

Figure 1:
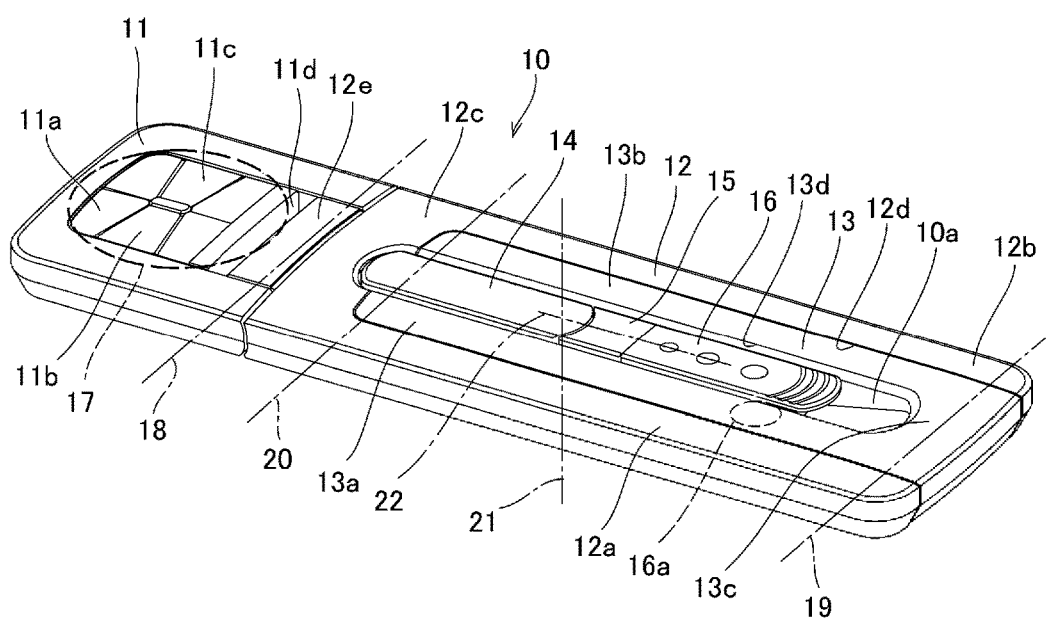
FIG. 1 is a perspective view of a document camera of a first embodiment in a folded state.
Figure 2:
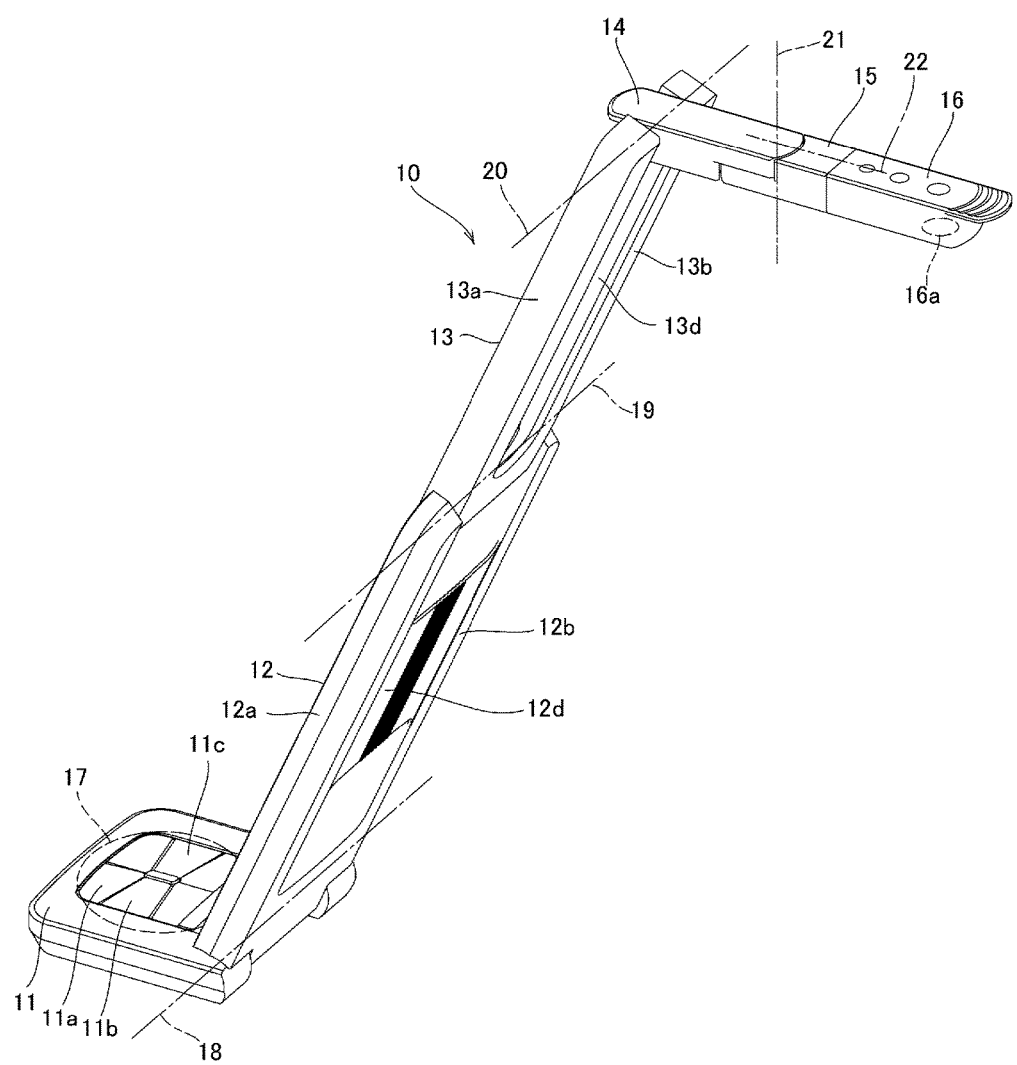
FIG. 2 is a perspective view of the document camera in one application mode.

A first embodiment will be described with reference to FIGS. 1 to 15. Referring first to FIG. 1, a document camera 10 of the first embodiment is shown in its folded state. FIG. 2 illustrates the document camera 10 in an application mode thereof. The document camera 10 includes a base 11, a first arm 12, a second arm 13, a third arm 14, a fourth arm 15 and a camera head 16.

The base 11 is formed into a flat box having a substantially rectangular planar shape and has an upper surface provided with various operation switches including a power-supply switch 11a, a zooming switch 11b adjusting a focal length of an imaging lens and an autofocus switch focusing the imaging lens. The base 11 has a front end formed with a recess 11d to which a proximal end of the first arm 12 is assembled. A permanent magnet 17 is incorporated in the base 11.

The first arm 12 has a pair of right and left arm pieces 12a and 12b and a bottom 12c connecting both arm pieces 12a and 12b. The first arm 12 is formed into a generally U-shaped plane. The first arm 12 has a width equal to a width of the base 11 and a thickness identical with a thickness of the base 11. A second arm housing recess 12d in which the second arm 13 is laid is defined by both arm pieces 12a and 12b and the bottom 12c. The bottom 12c has a shaft 12e which is integrally formed therewith and is fitted into the recess 11d of the base 11. The shaft 12e is assembled to the base 11 so as to be rotatable about a first pivot axis 18 in a front-back direction. The first arm 12 is assembled to the base 11 so as to be pivotable between a parallel extending position (see FIG. 1) and a raised position (see FIG. 2) where the first arm 12 is raised at an angle of about 60°. The first arm 12 is held at the parallel extending position or the raised position by a click mechanism incorporated in the shaft 12e.

The second arm 13 also has a pair of right and left arm pieces 13a and 13b and a bottom 13c connecting both arm pieces 13a and 13b in the same manner as the first arm 12. The second arm 13 is formed into a general U-shape. The bottom 13c is assembled between distal ends of both arm pieces 12a and 12b of the first arm 12 so as to be pivotable about a second pivot axis 19 in the front-back direction. A camera head housing recess 13d in which the third arm 14, the fourth arm 14 and the camera head 16 are laid is defined by both arm pieces 13a and 13b and the bottom 13c connecting the arm pieces 13a and 13b. The second arm 13 has a width substantially equal to a distance between both arm pieces 12a and 12b. The second arm 13 further has a thickness substantially equal to the thickness of the first arm 12. The second arm 13 is assembled to the first arm 12 so as to be pivotable between a laid and juxtaposed position (see FIG. 1) where the second arm 13 is laid in the second arm housing recess 12d of the first arm 12 thereby to be juxtaposed to the first arm 12 and a parallel extending position (see FIG. 1) where the second arm 13 extends from a distal end of the first arm 12 in parallel to the first arm 12 and further so as to be pivotable between the laid and juxtaposed position and a raised position where the second arm 13 is raised from the first arm 12 forward or backward. The second arm 13 is held at any pivot position by a friction mechanism (not shown) provided together with a second pivot axis 19.

The third arm 14 is formed into an elongate rectangular planar shape and has a width substantially equal to a distance between both arm pieces 13a and 13b of the second arm 13 and a thickness substantially equal to the thickness of the second arm 13. The third arm 14 has a proximal end which is provided between the distal ends of both arm pieces 13a and 13b of the second arm 13 so as to be pivotable about a third pivot axis 20 as illustrated in FIG. 2. The third arm 14 is assembled to the second arm 13 so as to be pivotable between a laid and juxtaposed position (see FIG. 1) where the third arm 14 is laid in a camera head housing recess 13d of the second arm 13 and juxtaposed to the second arm 13 and a raised position (see FIG. 2) where the third arm 14 is raised from the second arm forward or backward. The third arm 14 is held at any pivot position by a friction mechanism (not shown) provided together with the third pivot axis 20.

The fourth arm 15 has a width and a thickness both of which are substantially equal to a width and a thickness of the third arm 14 respectively. The fourth arm 15 is provided on a distal end of the third arm 15 so as to be pivotable about a fourth pivot axis 21 between an extending position (see FIG. 1) where the fourth arm 15 extends forward from the distal end of the third arm 14 and a position where the fourth arm 15 is bent rightward or leftward from the distal end of the third arm 14.

The camera head 16 is formed into an elongate rectangular planar shape and has a width and a thickness both of which are substantially equal to a width and a thickness of the fourth arm 15 respectively. The camera head 16 includes an imaging lens 16a provided on a distal end bottom thereof. The camera head 16 is assembled to the distal end of the fourth arm 15 so as to be pivotable about a fifth pivot axis 22 lengthwise extending.

The third arm 14, the fourth arm 15 and the camera head 16 can be laid in the camera head housing recess 13d of the second arm 13 while being aligned with one another, as illustrated in FIG. 1. The third arm 14, the fourth arm 15 and the camera head 16 have respective lengths set such that a gap 10a into which a finger is insertable is formed between the bottom 13c of the second arm 13 and the front end of the camera head 16. A stepped portion 16b onto which a finger can be put is provided on the front end of the camera head 16 as illustrated in FIG. 3.

Figure 3:
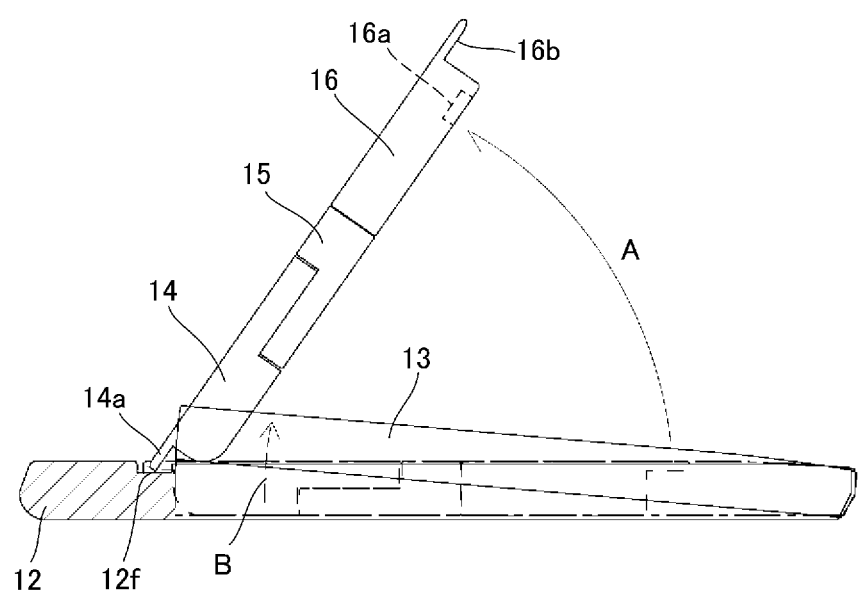
FIG. 3 is a partially broken side elevation of a first arm, a second arm, a third arm, a fourth arm and a camera head of the document camera.

Furthermore, a protruding end 14a protruding outward from the third pivot axis 20 is provided on an upper surface of the proximal end of the third arm 14, as illustrated in FIG. 3. On the other hand, an abutment stepped portion 12f is formed on the bottom 12c of the first arm 12. An underside of the protruding end 14a is placed on the abutment stepped portion 12f when the third arm 14 is located at the laid position. When the third arm 14, the fourth arm 15 and the camera head 16 are located at the respective laid positions, a finger is inserted into the gap 10a to be put onto the stepped portion 16b in order that the camera head 16 may be lifted. Then, since the distal end of the protruding end 14a abuts against the abutment stepped portion 12f, the second arm 13 is raised from the laid position by a predetermined angle with the abutting portion of the protruding end 14a serving as a pivot point.

The following describes usage of the document camera 10. When not in use, the document camera 10 is folded as illustrated in FIG. 1 and kept in a suitable place or carried with a user. In the folded state of the document camera 10, the first arm 12 is located at the parallel extending position, and the second arm 13 is laid in the second arm housing recess 12d of the first arm 12. Furthermore, the third and fourth arms 14 and 15 and the camera head 16 are laid in the camera head housing recess 13d of the second arm 13 in alignment with one another. In the folded state, the document camera 10 takes on an elongate flat box shape. Thus, the document camera 10 is foldable into a compact form.

Figure 4:
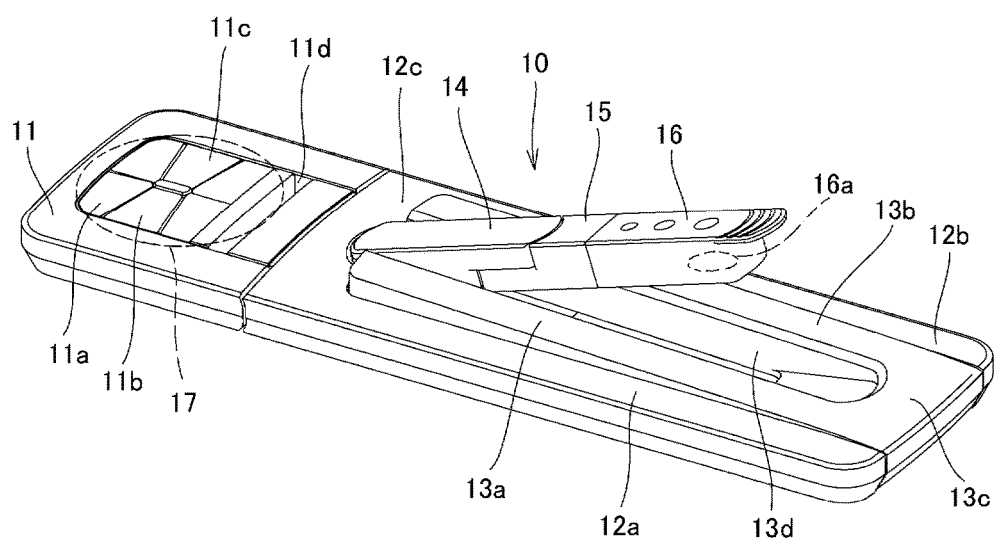
FIG. 4 is a perspective view of the document camera while the document camera is being set to the application mode.
Figure 5:
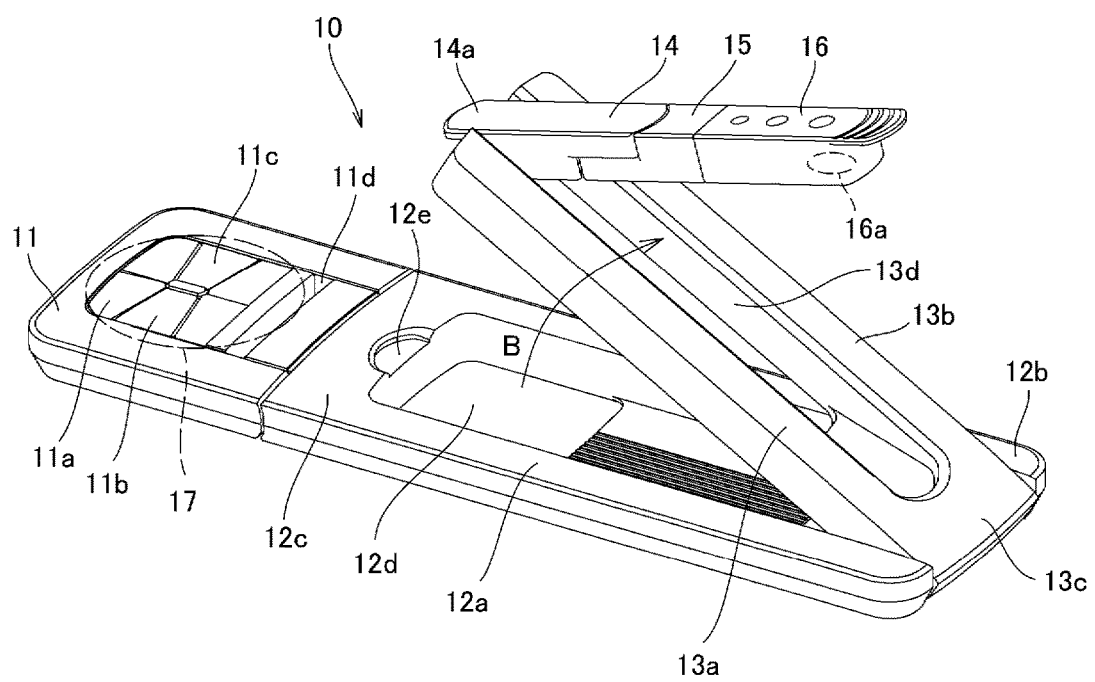
FIG. 5 is also a perspective view of the document camera while the document camera is being set to the application mode.
Figure 6:
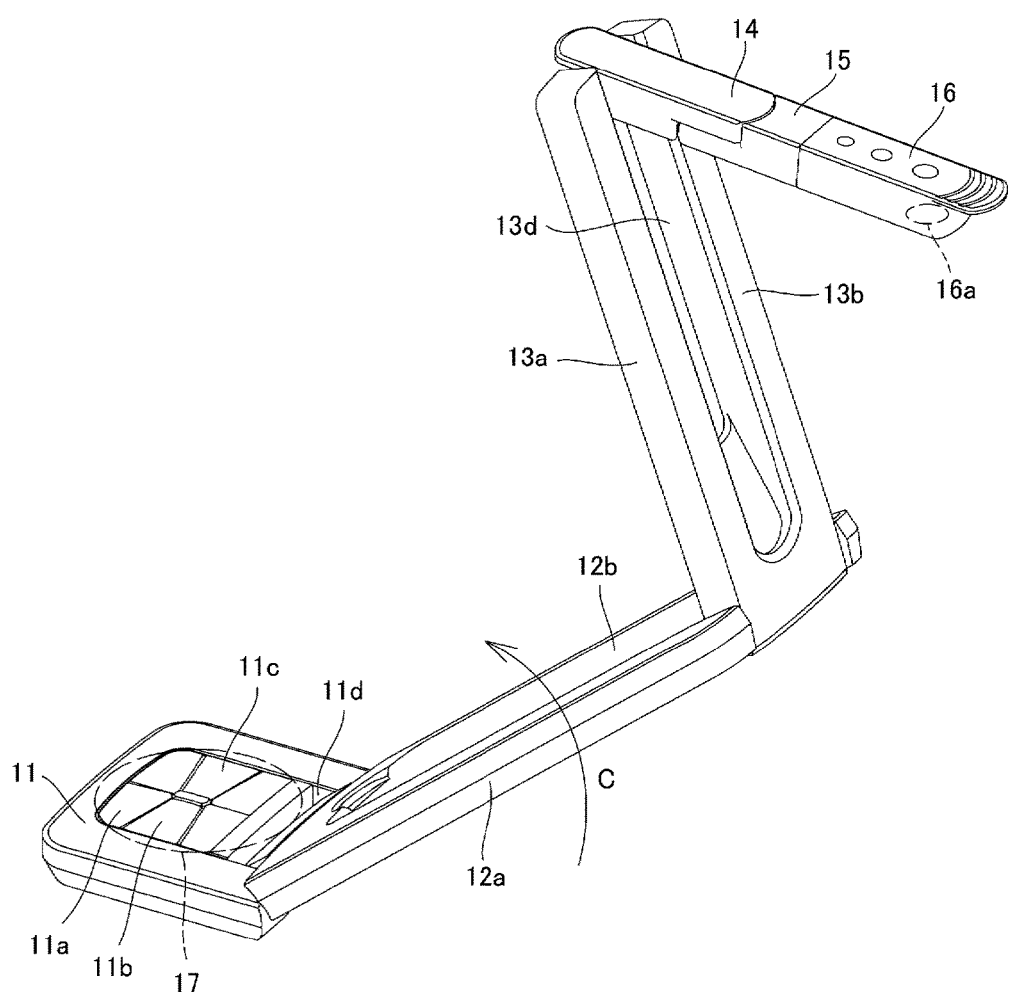
FIG. 6 is further a perspective view of the document camera while the document camera is being set to the application mode.

When a document is imaged by the document camera 10, a finger of the user is firstly inserted into the gap 10a between the camera head 16 and the bottom 13c of the second arm 13 to be put on the stepped portion 16b in order that the camera head 16 may be pulled to be raised in a direction of arrow A, as illustrated in FIGS. 3 and 4. Since the distal end of the protruding end 14a of the third arm 14 abuts against the abutment stepped portion 12f of the first arm 12 with raise of the camera head 16, the second arm 14 is raised from the laid position in a direction of arrow B by a predetermined angle with the abutting portion of the protruding end 14a serving as the pivot point. Then, the second arm 13 is further caused to pivot in the direction of arrow B thereby to be further raised from the first arm 12, as illustrated in FIG. 5. Next, the first arm 12 is caused to pivot in a direction of arrow C thereby to be raised from the front end of the base 11, as illustrated in FIG. 6. Subsequently, the second arm 13 is further caused to pivot from the distal end of the first arm 12 to a position where the second arm 13 extends in parallel to the first arm 12. The document camera 10 is set to a first application mode as illustrated in FIG. 2.

The document camera set in the first application mode is placed on a desk or a table each of which is provided with a magnetic top plate, such as an iron plate and is further caused to stick to the top plate by a permanent magnet incorporated in the base 11 thereby to be fixed. The document placed on the top plate is imaged by the camera head 16.

Figure 7:
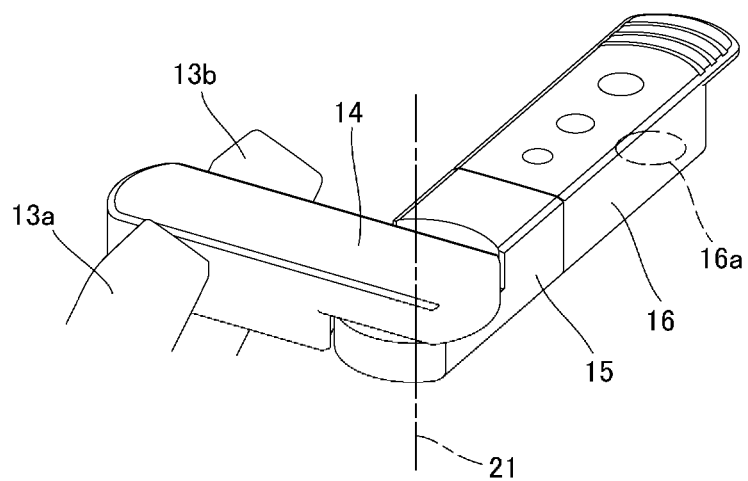
FIG. 7 is a perspective view of the third arm, the fourth arm and the camera head of the document camera.
Figure 8:
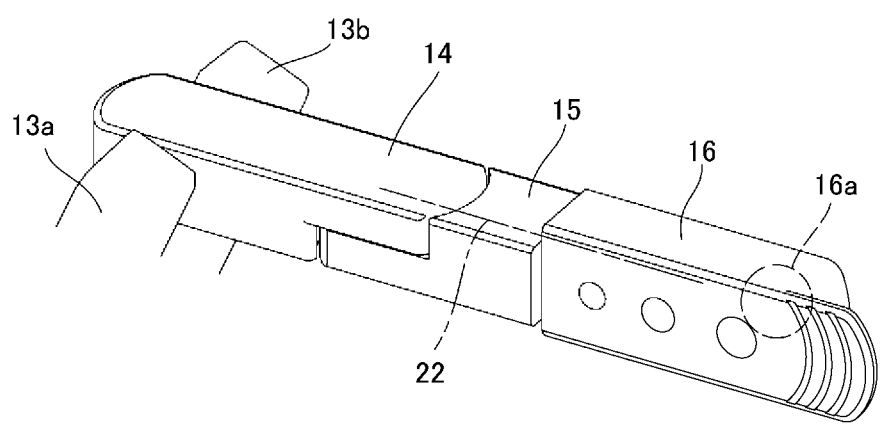
FIG. 8 is also a perspective view of the third arm, the fourth arm and the camera head of the document camera.

When the document is imaged, the camera head 16 is caused to pivot rightward or leftward about the fourth pivot axis 21 as illustrated in FIG. 7, so that the document covering right and left areas below the camera head 16 can be imaged. Furthermore, the camera head 16 is caused to pivot about the fifth pivot axis 22 as illustrated in FIG. 8, so that an imaging direction can be changed from below the camera head 16 to a lateral direction or an upper direction.

Figure 9:
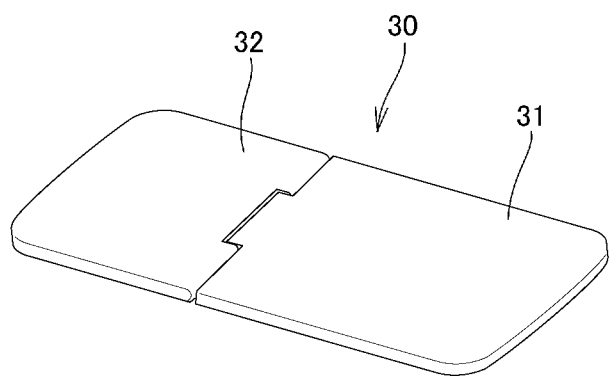
FIG. 9 is a perspective view of a support plate of the document camera.
Figure 10:
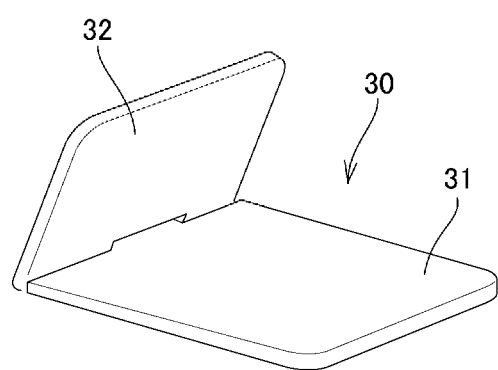
FIG. 10 is also a perspective view of a support plate of the document camera.

The document camera 10 becomes more convenient when a support plate 30 as illustrated in FIG. 9 is used therewith. The support plate 30 is made of a thin steel sheet and comprises a first plate 31 and a second plate 32 assembled to the first plate 31. The support plate 30 takes on a first form in which the first and second plates 31 and 32 are coplanar and a second form in which the second plate 32 is folded at one end of the first plate 31 so that the plates 21 and 32 have a generally L-shape as illustrated in FIG. 10.

Figure 11:
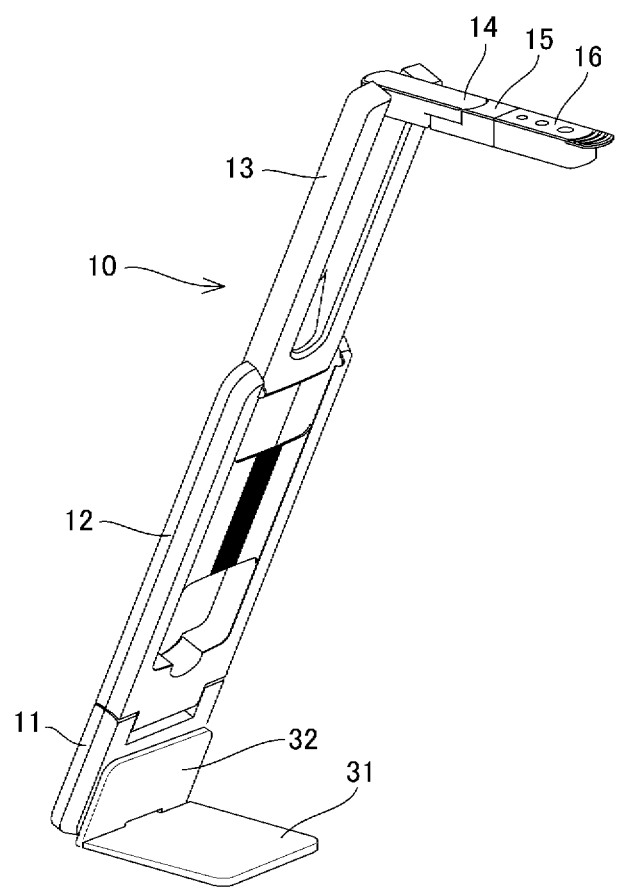
FIG. 11 is a perspective view of the document camera to which the support plate is attached.

When the document camera 10 is used together with the support plate 30, the support plate 30 is folded into the L-shape and the base 11 of the document camera 10 is caused to stick to the second plate 32 raised from the first plate 31 by the permanent magnet 17, as illustrated in FIG. 11. The document camera 10 can be installed on a desk or the like in a raised state by the use of the support plate 30 even when the base 11 cannot be caused to stick to a wooden top plate of a desk or a table or another top plate to which the base 11 cannot stick by the permanent magnet 17.

Figure 12:
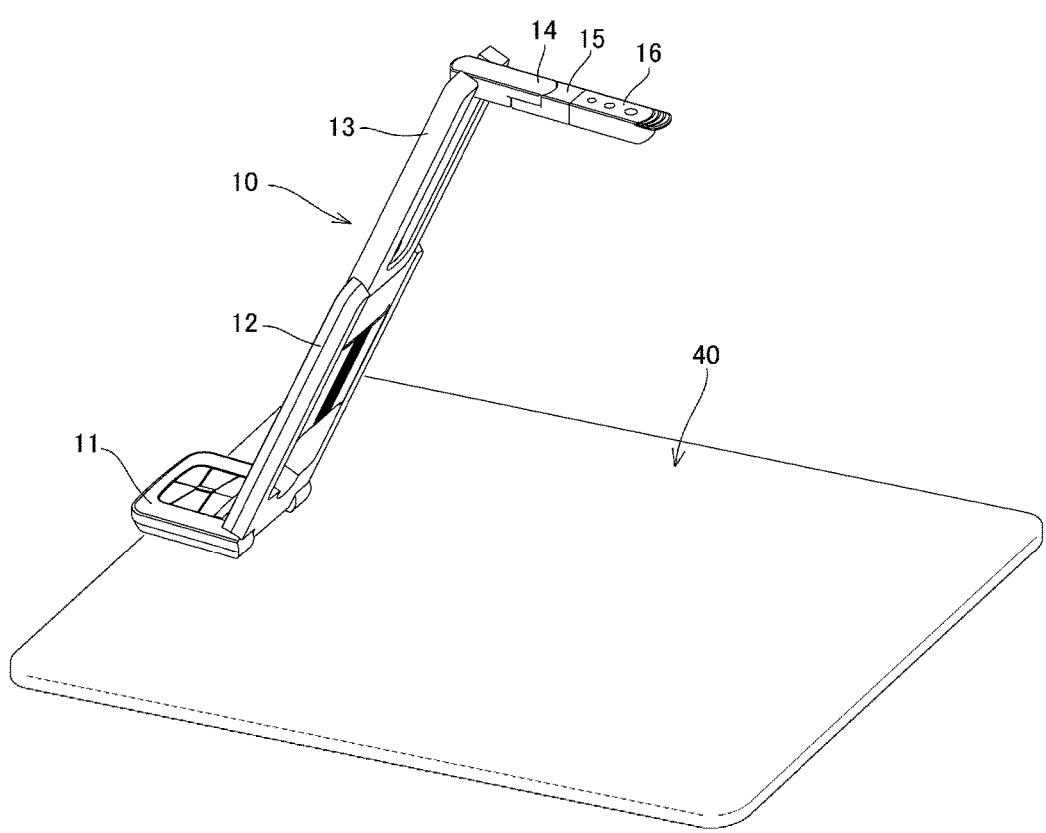
FIG. 12 is a perspective view of another support plate.
Figure 13:
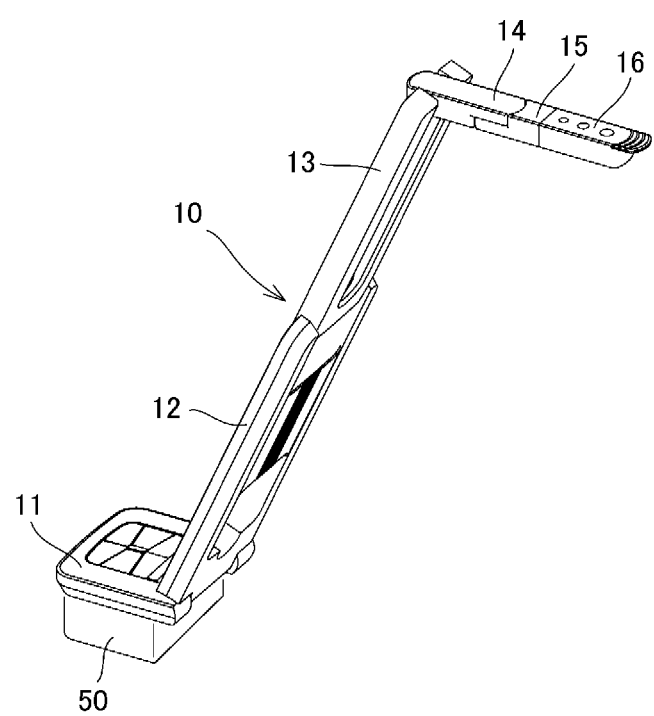
FIG. 13 is a perspective view of the document camera set on a mount.
Figure 14:
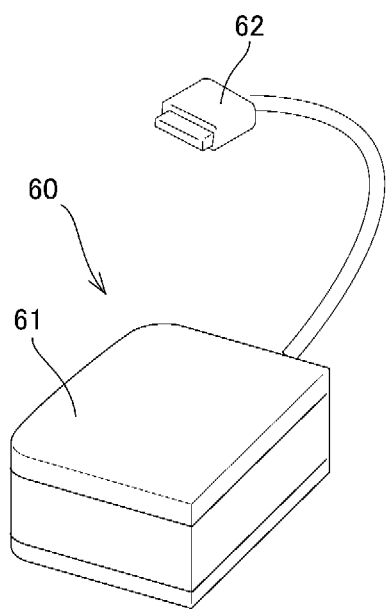
FIG. 14 is a perspective view of another mount for the document camera.
Figure 15:
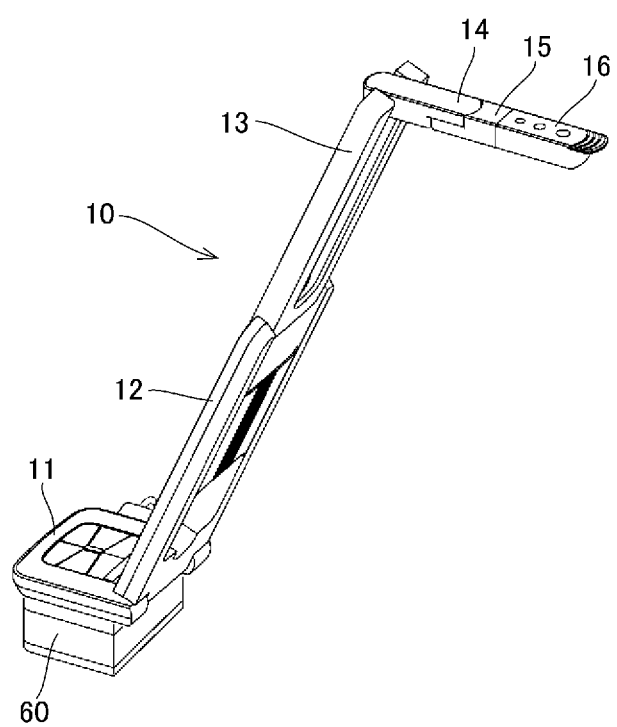
FIG. 15 is a document camera set on the another mount.

Furthermore, the document camera 10 becomes more convenient when used together with a support plate 40 as illustrated in FIG. 12, a mount 50 as illustrated in FIG. 13 or a mount 60 as illustrated in FIGS. 14 and 15. The support plate 40 as illustrated in FIG. 12 has an area necessary to be used as a stage on which a document is placed. The document is placed on the support plate 40 and the document camera 10 is caused to stick to the support plate 40 by the permanent magnet 17 into a raised state, so that the document on the support plate 40 can be imaged by the document camera 10.

The mount 50 as illustrated in FIG. 13 has a top plate comprising a magnetic body such as a thin steel sheet. The mount 50 has a predetermined weight such that the document camera 10 can be prevented from falling over by the self-weight when set on the top plate of the mount 50 with the base 11 sticking to the top plate by the permanent magnet 17. The camera head 16 of the document camera 10 can be set at a higher location as the result of use of the mount 50.

A mount 60 as illustrated in FIG. 14 has a top plate 61 made of a magnetic material and is provided with a function of power charger. The mount 60 is connectable via an accompanying connector 62 to the base 11 of the document camera 10. The document camera 10 can be set on the mount 60 in a raised state when the base 11 is caused to stick to the top plate 61 of the mount 60 by the permanent magnet 17.

The mount 60 has a predetermined weight such that the document camera 10 can be prevented from falling over by the self-weight when set on the top plate of the mount 60 with the base 11 sticking to the top plate by the permanent magnet 17.

According to the document camera of the first embodiment, when the camera head 16 is pulled to be raised, the distal end of the protruding end 14a of the third arm 14 provided on the distal end of the camera head 16 abuts against the abutment stepped portion 12f of the first arm 12, so that the second arm 13 is raised from the laid position by the predetermined angle with the abutting portion of the protruding end 14a serving as the pivot point. As a result, the user can instantaneously determine the direction in which the second arm 13 is pulled to be raised in order that the document camera 10 may be set to the usage state. Accordingly, an operation procedure for setting the folded document camera 10 to the usage state is easily understandable with the result that the document camera 10 has a high level of usability.

When the document camera 10 is to be folded, the second arm 13 is laid in juxtaposition with the first arm 12 inside the first arm 12 extending forward from the front end of the base 11. The third arm 14, the fourth arm 15 and the camera head 16 are laid in juxtaposition inside the second arm 13. Accordingly, the first to fourth arms 12 to 15 and the camera head 16 do not overlap the base 11 in the up-down direction. Furthermore, since the width of the base 11 is equal to the width of the first arm 12, the document camera 10 is foldable into the flat elongate box shape. Thus, since the document camera 10 is not bulky, the document camera 10 can offer convenience for safekeeping and carrying.

The base 11 is caused to stick to the top plate or a side plate each of which is made of the magnetic material, the support plate 30 or the support plate 40 each of which is made of the magnetic material, or the mount 50 or 60. As a result, the document camera 10 can be prevented from falling over by the self-weight thereby to be incapable of imaging.

When the folded document camera 10 is to be set to the usage state, the finger is inserted into the gap 10a between the front end of the camera head 16 and the bottom 13c of the U-shaped second arm 13 to pull and raise the camera head 16. As a result, the usability of the document camera 10 can be improved.

The camera head 16 is pivotable rightward and leftward. Furthermore, since the camera head 16 can be turned to change the orientation of the imaging lens 16a, an imaging area can be widened with the result that the usability of the document camera 10 can be improved.

Figure 16:
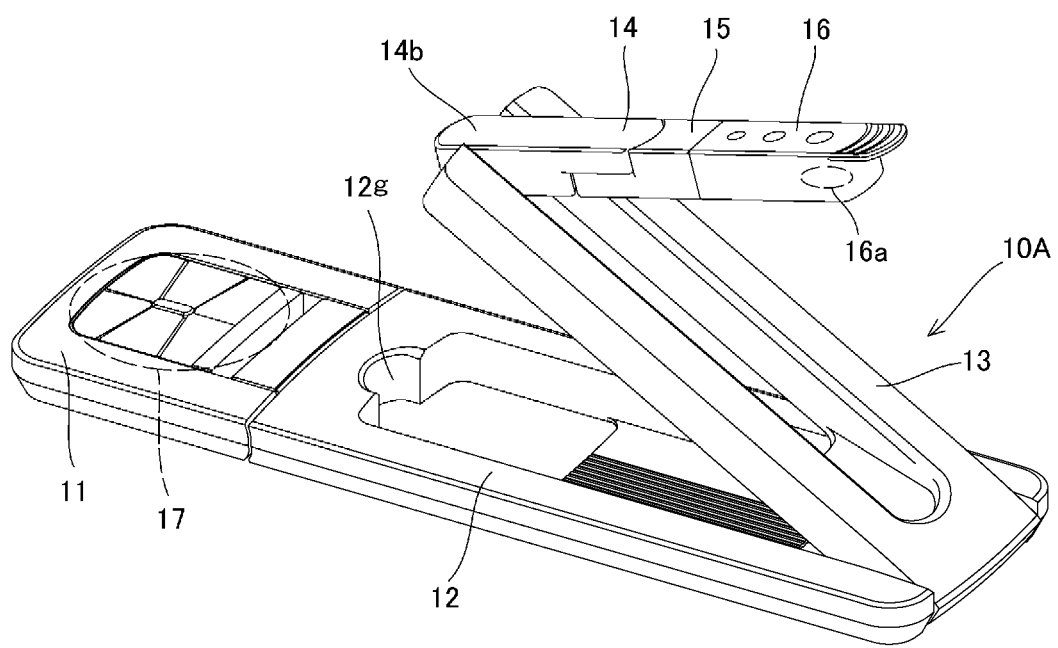
FIG. 16 is a perspective view of the document camera of a second embodiment.
Figure 17:
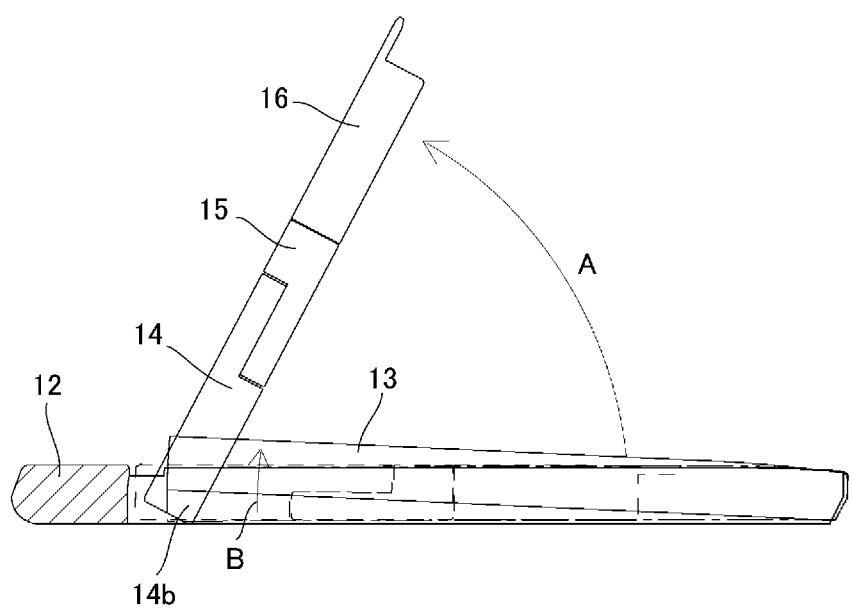
FIG. 17 is a partially broken side elevation of a first arm, a second arm, a third arm, a fourth arm and a camera head of the document camera of the second embodiment.

FIG. 16 illustrates a document camera 10A of a second embodiment. A cutout 12g is formed in the central bottom of the first arm 12 of the document camera 10A. As shown in FIG. 17 when the camera head 16 is pulled and raised, the protruding end 14b of the third arm 14 abuts via the cutout 12g against a mounting surface for the document camera 10A, so that the second arm 13 is raised from the laid position by a predetermined angle with the abutting portion of the protruding end 14b serving as the pivot point.

The other construction of the document camera 10A is identical with that of the document camera 10 of the first embodiment. Accordingly, identical or similar parts in the second embodiment are labeled by the same reference symbols as those in the first embodiment. The description of these identical or similar parts will be eliminated.

Although the permanent magnet 17 is incorporated in the base 11 in each of first and second embodiments, a suction disk, a double-faced adhesive tape, adhesive gel or the like may be provided on the bottom of the base 11, instead of the permanent magnet 17.

Figure 18:
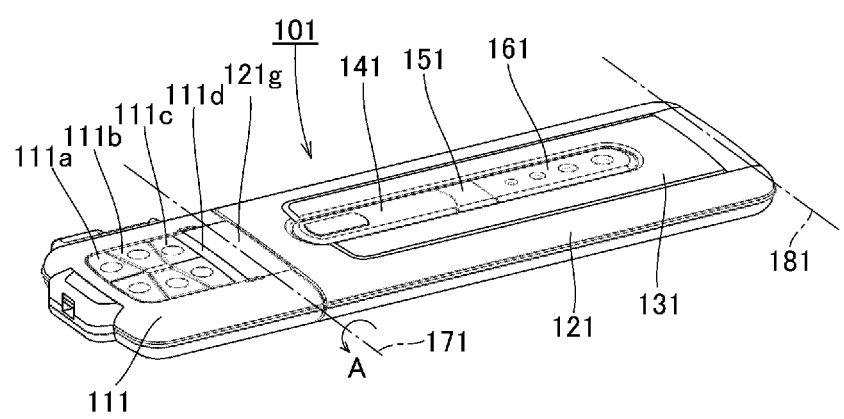
FIG. 18 is a perspective view of a document camera of a third embodiment in a folded state.
Figure 19:
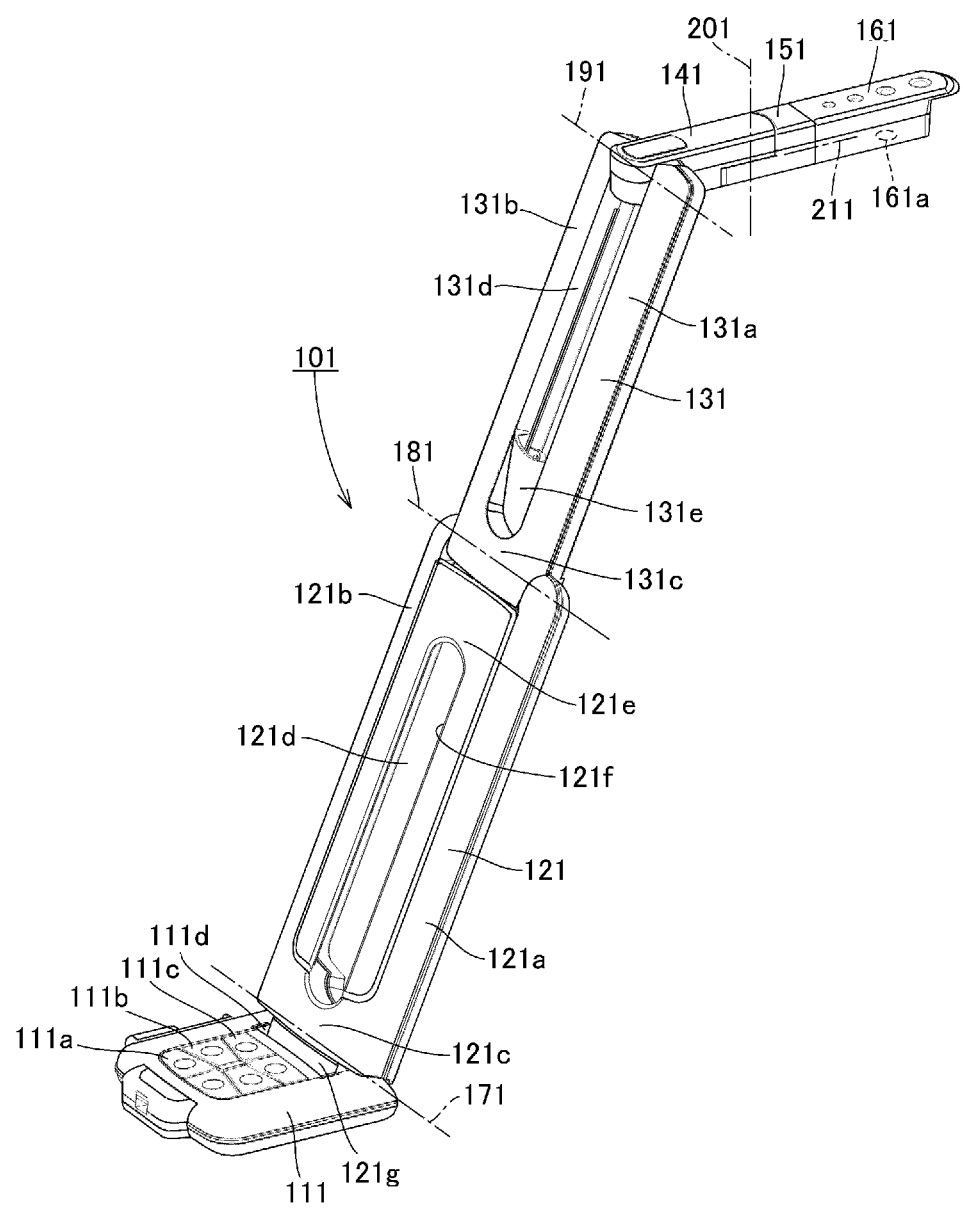
FIG. 19 is a perspective view of the document camera in a first application mode.
Figure 20:
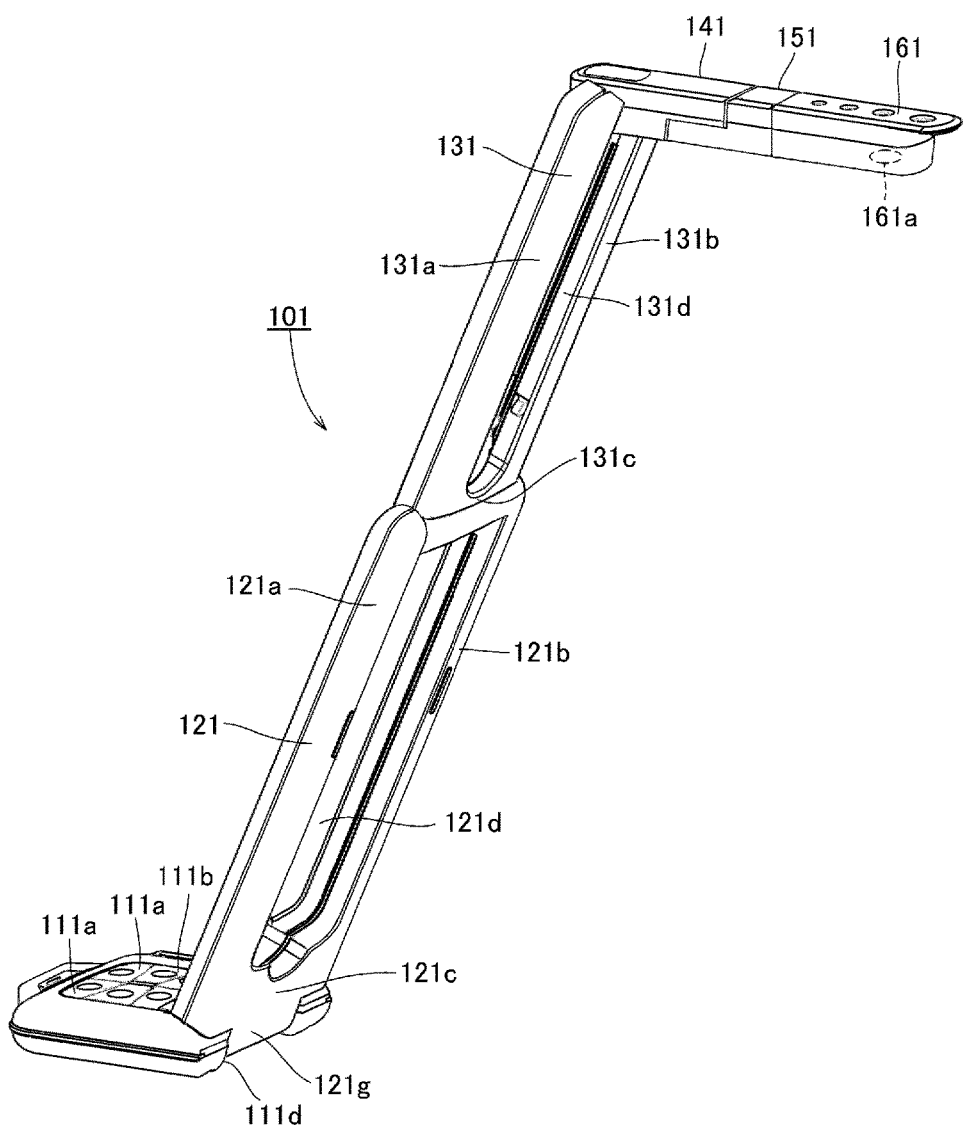
FIG. 20 is also a perspective view of the document camera in the first application mode.

A third embodiment will be described with reference to FIGS. 18 to 31. Referring to FIG. 18, a document camera 101 of the third embodiment is illustrated in the folded state. FIGS. 19 and 20 illustrate the document camera 101 in a first application mode. The document camera 101 includes the base 111, the first arm 121, the second arm 131, the fourth arm 141 and the camera head 161.

The base 111 is formed into a flat box having a substantially rectangular planar shape and has an upper surface provided with various operation switches including a power-supply switch 111a, a zooming switch 111b adjusting a focal length of the imaging lens 161a and an autofocus switch 111c focusing the imaging lens 161a. The base 111 has the front end formed with the recess 111d to which the proximal end of the first arm 121 is assembled. The permanent magnet is incorporated in the base 111.

The first arm 121 has a pair of right and left arm pieces 121a and 121b and a bottom 121c connecting both arm pieces 121a and 121b. The first arm 121 is formed into a generally U-shaped plane. A second arm housing recess 121d in which the second arm 131 is laid is defined by both arm pieces 121a and 121b and the bottom 121c. The second arm housing recess 121d has two side openings one of which is covered by a second arm stopper plate 121e, as illustrated in FIG. 19. The other side opening of the second arm housing recess 121d is open so that the second arm 131 is laid therethrough, as illustrated in FIG. 20. The second arm stopper plate 121e is formed with a window 121f.

The first arm 121 has a width and a thickness both of which are equal to the width and the thickness of the base 111 respectively. The bottom 121c has a shaft 121g which is integrally formed therewith and is fitted into the recess 111d of the base 111. The shaft 121g is assembled to the base 111 so as to be rotatable about a first rotation axis 171 in a front-back direction. The first arm 121 is assembled to the base 111 so as to be pivotable between a parallel extending position (see FIG. 18) where the first arm 121 extends in front of the base 111 in parallel to the base 111 and a raised position (see FIGS. 19 and 20) where the first arm 12 is raised from the base 111. The first arm 121 is held at the parallel extending position or the raised position by a friction mechanism incorporated in the shaft 121g.

The second arm 131 also has a pair of right and left arm pieces 131a and 131b and a bottom 131c connecting both arm pieces 131a and 131b in the same manner as the first arm 121. The second arm 131 is formed into a general U-shape. A camera head housing recess 131d in which the third arm 141, the fourth arm 151 and the camera head 161 are laid is defined by both arm pieces 131a and 131b and the bottom 131c. The bottom 131c is assembled between distal ends of both arm pieces 121a and 121b of the first arm 121 so as to be pivotable about the second pivot axis 181 in the front-back direction. The second arm 131 has a width substantially equal to a width of the second arm housing recess 121d and a thickness substantially equal to the thickness of the first arm 121. The second arm 131 is assembled to the first arm 121 so as to be pivotable between a laid position (see FIG. 18) where the second arm 131 is laid in the second arm housing recess 121d of the first arm 121 thereby to be juxtaposed to the first arm 121 and a raised position (see FIGS. 19 and 20) where the second arm 131 is raised from the laid position and further so as to be pivotable between the raised position and the parallel extending position where the second arm 131 extends in front of the first arm 121 in parallel to the first arm 121. The second arm 131 is held at any pivot position by a friction mechanism (not shown) provided together with a second pivot axis 181.

The second arm 131 has an end located at the second pivot axis 181 side of the camera head housing recess 131*d*. A camera head stopper piece 131*e* is provided on the second pivot axis 181 side end of the second arm 131. The distal end of the camera head 161 abuts against the stopper piece 131*e* so that the stopper piece 131*e* prevents the third and fourth arms 141 and 151 and the camera head 161 all located at the laid position from reverse pivot when the third and fourth arms 141 and 151 and the camera head 161 are caused to pivot from the laid position to the raised position.

The third arm 141 is formed into an elongate rectangular planar shape and has a width substantially equal to the width of the camera head housing recess 131*d* of the second arm 131 and a thickness substantially equal to the thickness of the second arm 131. The third arm 141 has a proximal end which is assembled between distal ends of both arm pieces 131*a* and 131*b* of the second arm 131 so as to be pivotable about the second pivot axis 191 in the front-back direction.

The fourth arm 151 has a width and a thickness both of which are substantially equal to the width and the thickness of the third arm 141 respectively. The fourth arm 15 is provided on a distal end of the third arm 141 so as to be pivotable about a fourth pivot axis 201 between an extending position (see FIG. 19) where the fourth arm 151 extends forward from the distal end of the third arm 141 and the position where the fourth arm 151 is bent rightward or leftward from the distal end of the third arm 141.

The camera head 161 is formed into an elongate rectangular planar shape and has the width and the thickness both of which are substantially equal to the width and the thickness of the fourth arm 151 respectively. The camera head 161 includes the imaging lens 161*a* provided on the distal end bottom thereof. The camera head 161 is assembled to the distal end of the fourth arm 151 so as to be pivotable about a fifth pivot axis 211 lengthwise extending with respect to the fourth arm 151.

The third arm 141, the fourth arm 151 and the camera head 161 can be laid in the camera head housing recess 131*d* of the second arm 131 while being aligned with one another, as illustrated in FIG. 18. The third arm 141, the fourth arm 151 and the camera head 161 all laid in the camera head housing recess 131*d* are exposed through the window 121*f*. The third arm 141 is assembled to the second arm 131 so as to be pivotable between the laid position where the third arm 141 is laid in the camera head housing recess 131*d* and the raised position where the third arm 141 is raised forward or backward as shown in FIG. 19. The third arm 141 is held at any pivot position by the friction mechanism provided about the pivot axis 191.

The following describes usage of the document camera 101. When not in use, the document camera 10 is folded as illustrated in FIG. 18 and kept in a suitable place or carried with the user. In the folded state of the document camera 101, the first arm 121 is located at the parallel extending position, and the second arm 13 is laid in the second arm housing recess 121*d* of the first arm 121. Furthermore, the third and fourth arms 141 and 151 and the camera head 161 are laid in the camera head housing recess 131*d* of the second arm 131 in alignment with one another. In the folded state, the document camera 101 takes on an elongate flat box shape. Thus, the document camera 101 is foldable into a compact form.

Figure 21:
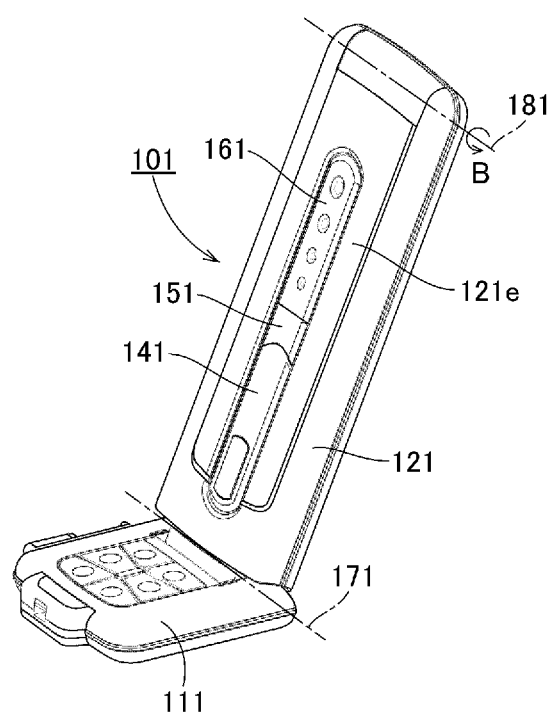
FIG. 21 is a perspective view of the document camera while being set to the first application mode.
Figure 22:
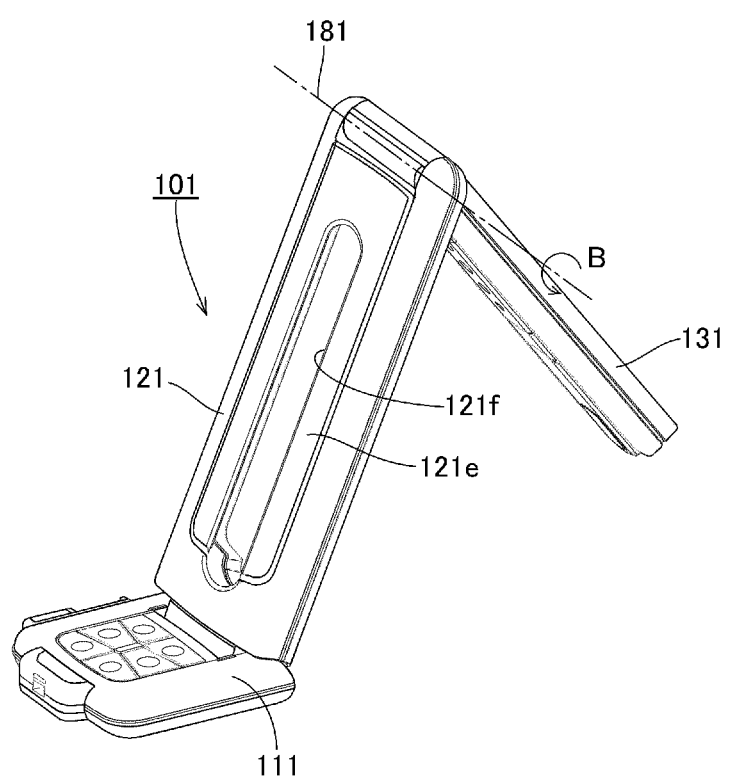
FIG. 22 is also a perspective view of the document camera while being set to the first application mode.
Figure 23:
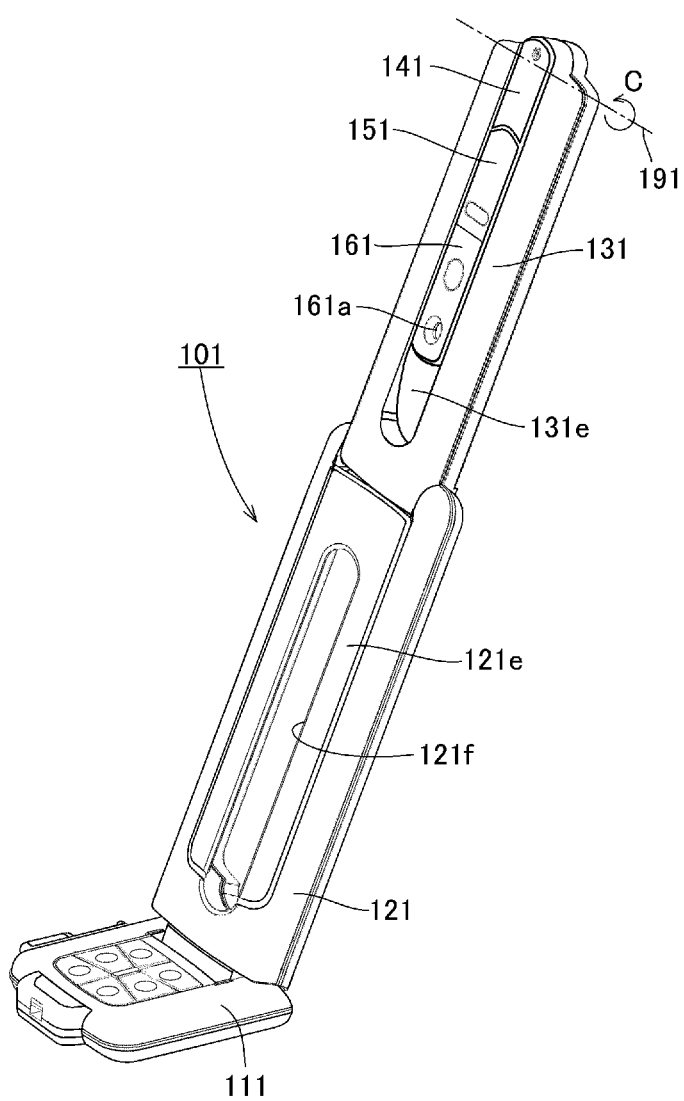
FIG. 23 is further a perspective view of the document camera while being set to the first application mode.
Figure 24:
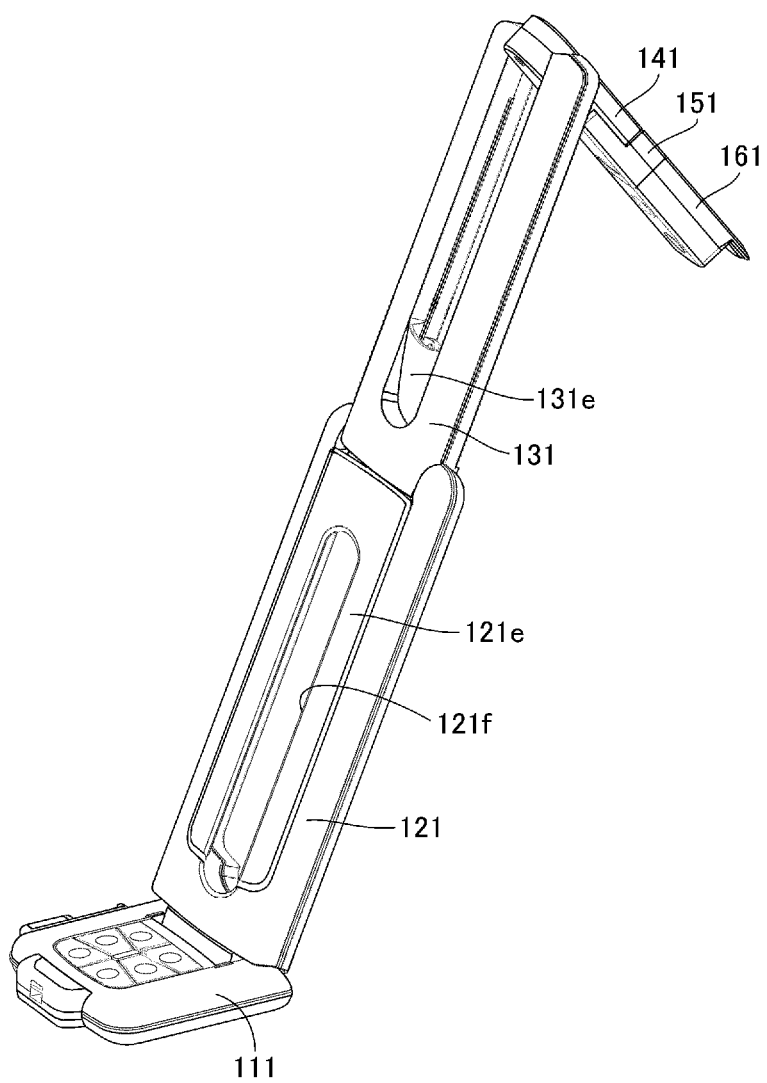
FIG. 24 is still further a perspective view of the document camera while being set to the first application mode.

When a document is imaged by the document camera 101, the first arm 121 located at the parallel extending position is caused to pivot about the first pivot axis 171 in the counterclockwise direction as shown by arrow A in FIG. 18, thereby to be raised as illustrated in FIG. 21. Subsequently, the second arm 131 laid in the second arm housing recess 121*d* of the first arm 121 located at the raised position is caused to pivot about the second pivot axis 181 in the counterclockwise direction as shown by arrow B in FIG. 21, thereby to be raised from second arm hosing recess 121*d*. The second arm 131 located at the raised position is further caused to pivot in the counterclockwise direction to the parallel extending position as shown in FIG. 23. Subsequently, the third and fourth arms 141 and 151 and the camera head 161 all laid in the camera head housing recess 131*d* are caused to pivot about the third pivot axis 191 in the counterclockwise direction as shown by arrow C in FIG. 23, thereby to be raised from the camera head housing recess 131*d* as illustrated in FIG. 24. The camera head 161 is caused to pivot to a position where the camera head 161 is substantially in parallel to the mounting surface of the base 111, as illustrated in FIGS. 19 and 20. The document camera 101 is thus set into the first application mode illustrated in FIGS. 19 and 20 by the foregoing operation procedure.

The document camera 101 set in the first application mode is placed on a desk or a table each of which is provided with a magnetic top plate, such as a steel plate and is further caused to stick to the top plate by a permanent magnet incorporated in the base 111 thereby to be fixed. The document placed on the top plate is imaged by the camera head 161.

Figure 25:
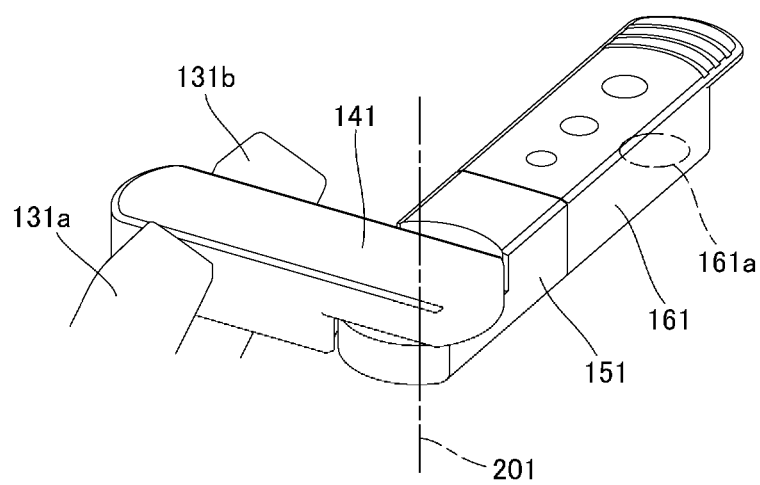
FIG. 25 is a perspective view of the camera head, showing a usage thereof.
Figure 26:
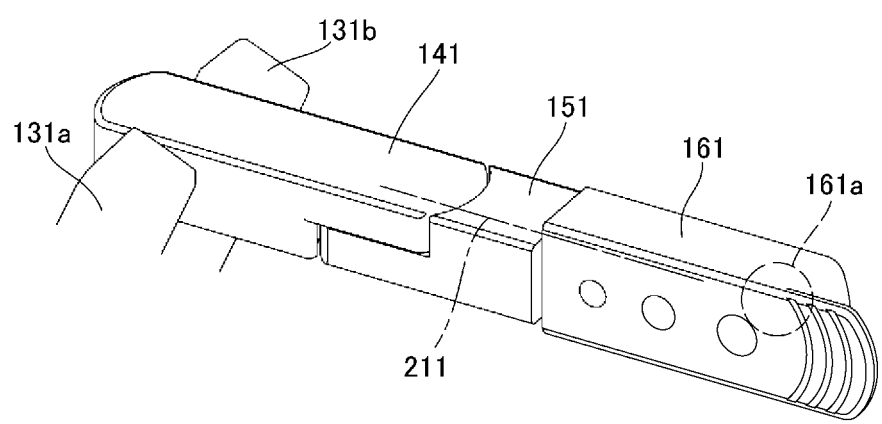
FIG. 26 is a perspective view of the camera head, showing another usage thereof.

When the document is imaged, the camera head 161 is caused to pivot rightward or leftward about the fourth pivot axis 201 as illustrated in FIG. 25, so that the document covering right and left areas below the camera head 161 can be imaged. Furthermore, the camera head 16 is caused to pivot about the fifth pivot axis 211 as illustrated in FIG. 26, so that an imaging direction can be changed from below the camera head 161 to a lateral direction or an upper direction.

Figure 27:
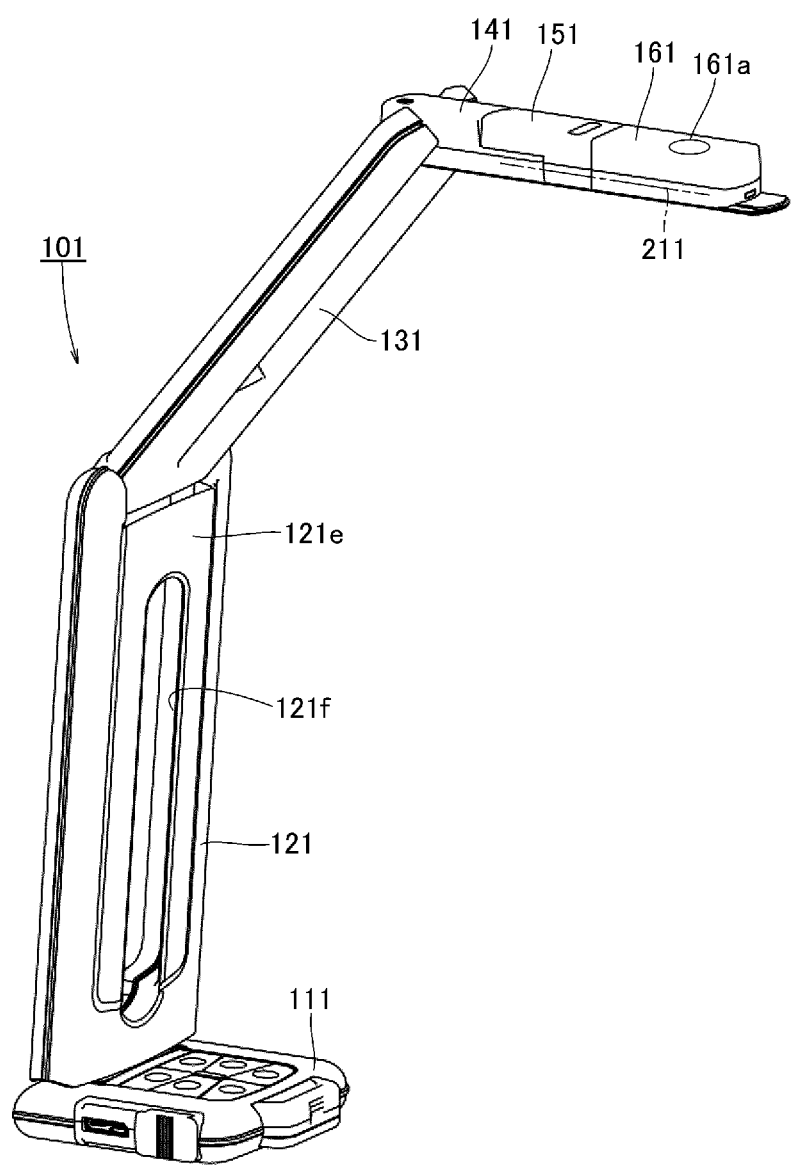
FIG. 27 is a perspective view of the document camera in a second application mode.

FIG. 27 illustrates a second application mode of the document camera 101. The document placed in front of the base 111 is imaged in the first application mode of the document camera 101 as illustrated in FIGS. 19 and 20. In the second application mode, however, a document placed in the back of the base 111 is imaged.

Figure 28:
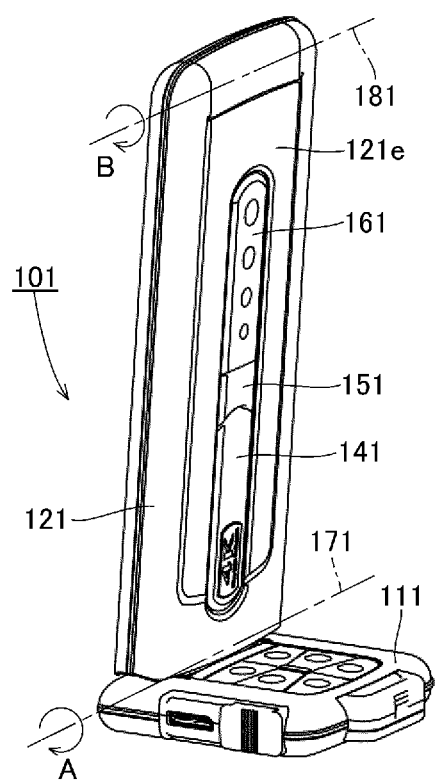
FIG. 28 is a perspective view of the document camera while being set to the second application mode.
Figure 29:
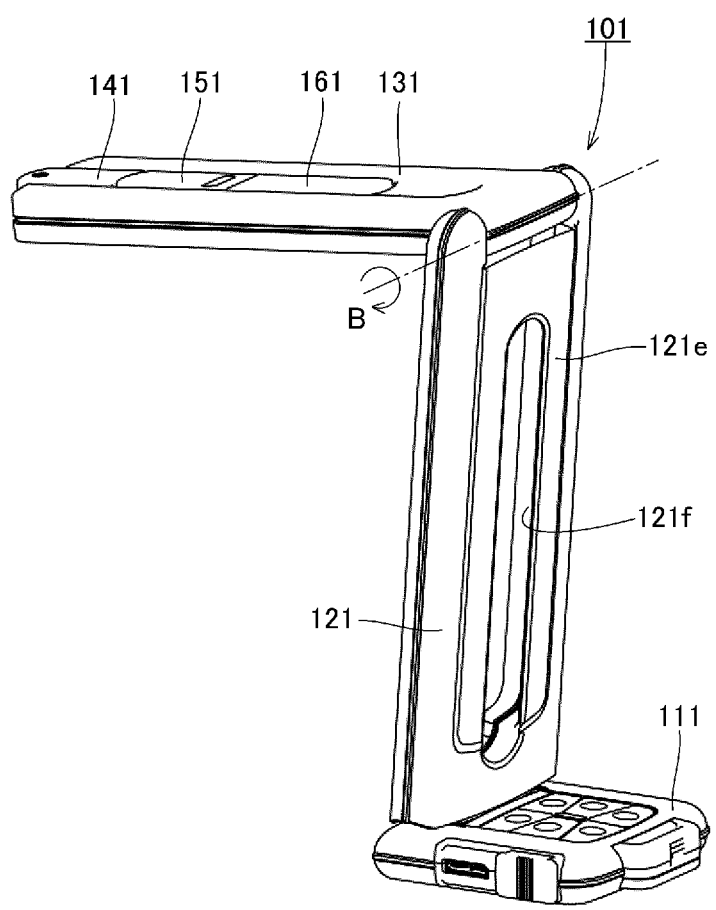
FIG. 29 is also a perspective view of the document camera while being set to the second application mode.
Figure 30:
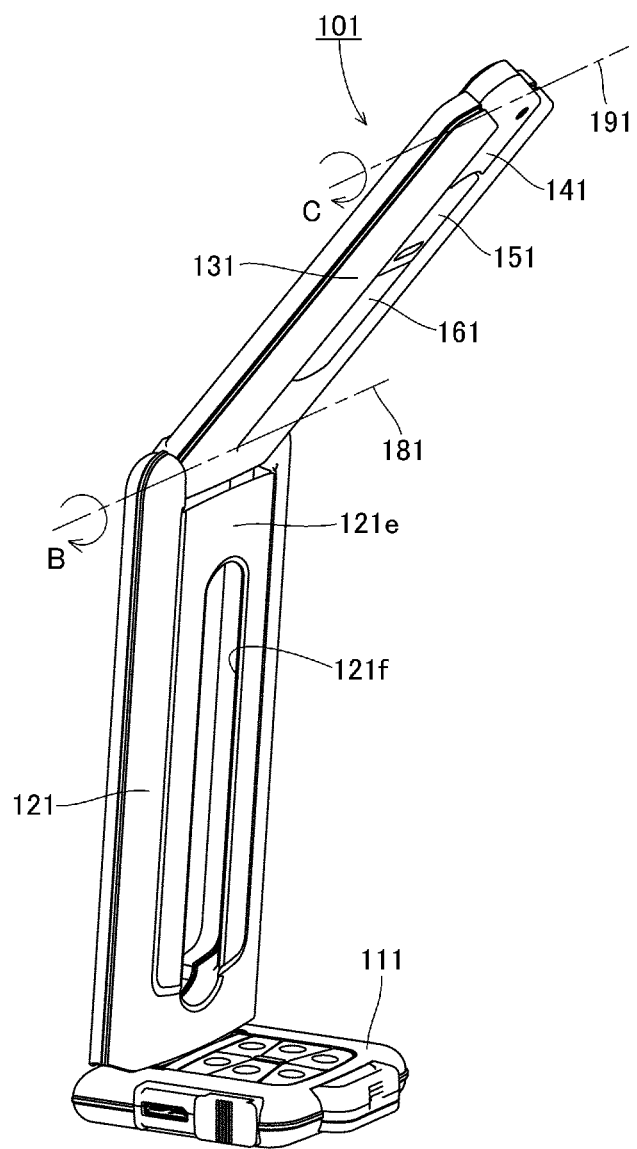
FIG. 30 is further a perspective view of the document camera while being set to the second application mode.
Figure 31:
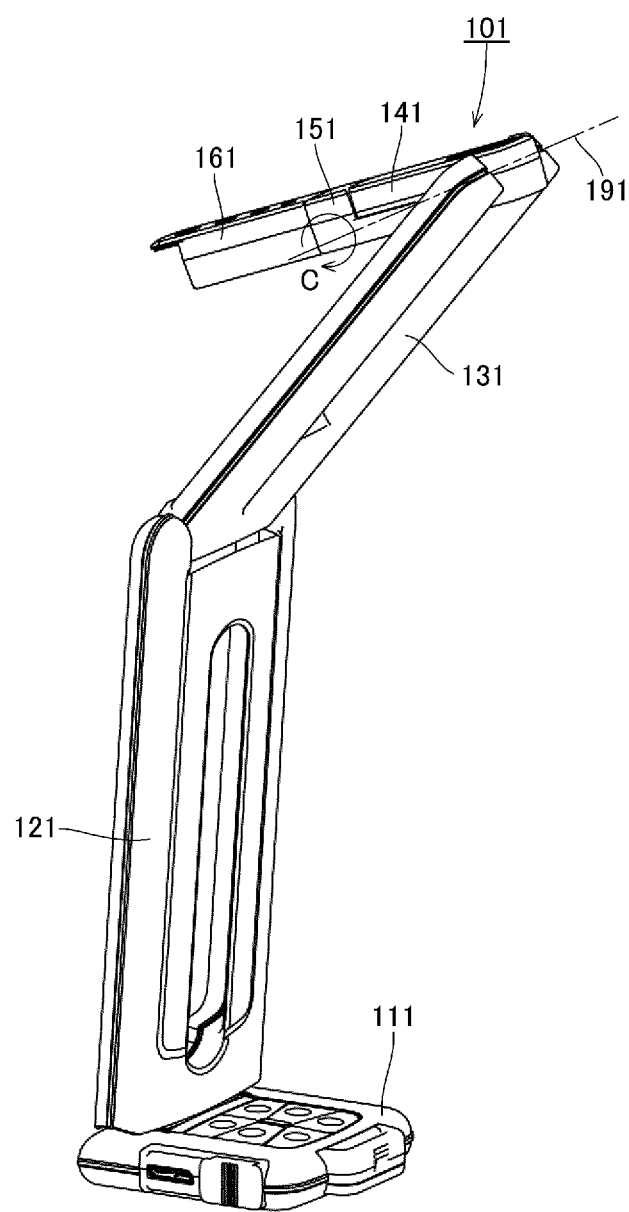
FIG. 31 is still further a perspective view of the document camera while being set to the second application mode.

The following describes a procedure for setting the folded document camera 101 in the second application mode. The first arm 121 is caused to pivot about the first pivot axis 171 in the direction of arrow A so as to be raised until the first arm 121 makes a substantially right angle with the base 111, as illustrated in FIG. 28. Next, the second arm 131 is caused to pivot about the second pivot axis 181 in the direction of arrow B, so that the second arm 131 extends in front of the base 111 as illustrated in FIG. 29. Subsequently, the second arm 131 is further caused to pivot in the direction of arrow B thereby to extend obliquely upward in the back of the base 111, as shown in FIG. 30. The camera head 161 is then caused to pivot in the direction of arrow C thereby to be raised from the camera head housing recess 131*d*, as illustrated in FIG. 31. The camera head 161 is further caused to pivot in the direction of arrow C until the camera head 161 becomes substantially parallel to the mounting surface of the base 111, as illustrated in FIG. 27. The camera head 161 is still further caused to pivot about the fifth pivot axis 211 so that the imaging lens 161*a* is directed to the mounting surface of the base 111.

According to the document camera 101 of the third embodiment, when the camera head 161 is to be folded, the first arm 121 extends forward from the front end of the base 111, and the second arm 131 is laid in the second arm housing recess 121d formed in the first arm 121. The third and fourth arms 141 and 151 and the camera head 161 are laid in the camera head housing recess 131d formed in the second arm 131. Accordingly, the base 111, the first to fourth arms 12 to 15 and the camera head 16 do not overlap one another in the up-down direction. Furthermore, the first to fourth arms 121 to 151 and the camera head 161 are substantially coplanar with the base 111 with the result that the document camera 10 is foldable into the flat elongate box shape.

In the folded state of the document camera 101, the first arm 121 is located at the parallel extending position and extends forward from the front end of the base 111 in parallel to the base 111. Accordingly, the operator can understand, at a glance, that the first arm 121 should be raised in order to set the document camera 101. When the second arm 131 located at the laid position is raised, the second arm stopper plate 121e prevents the second arm 131 from pivoting in the direction reverse to the pivoting direction of the first arm 121 from the parallel extending position to the raised position. Furthermore, the camera head stopper piece 131e prevents the camera head 161 located at the laid position from pivoting in the direction reverse to the pivoting direction of the second arm 131 from the laid position to the raised position. Accordingly, the direction in which the first arm 121 is caused to pivot from the parallel extending position to the raised position is identical with the direction in which the second arm 131 is caused to pivot from the laid position to the raised position and the direction in which the camera head 161 is caused to pivot from the laid position to the raised position, and vice versa.

The direction in which the camera head 161 is caused to pivot from the raised position to the laid position is also identical with the direction in which the second arm 131 is caused to pivot from the raised position to the laid position and the direction in which the first arm 121 is folded from the raised position to the parallel extending position, and vice versa. Accordingly, the first and second arms 121 and 131 and the camera head 161 are easily operable to be set and folded.

Furthermore, the document camera 101 can image the document located in the back of the base 111 when set to the second application mode as illustrated in FIG. 27 as well as the document camera 101 can image the document located in front of the base 111 when set to the first application mode as illustrated in FIGS. 19 and 20, with the result that the usability of the document camera 101 can be improved.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A document camera comprising:
a base;
a first arm assembled to a front end of the base so as to be pivotable in a front-back direction;
a second arm assembled to a distal end of the first arm so as to be pivotable in the front-back direction; and
a camera head assembled to a distal end of the second arm so as to be pivotable in the front-back direction, wherein:
the first arm is pivotable between a parallel extending position where the first arm extends forward from the front end of the base in parallel to the base and a raised position where the first arm is raised upward from the front end of the base;
the second arm is pivotable between a juxtaposed position where the second arm is juxtaposed to the first arm and a raised position where the second arm is raised from the first arm, the second arm being further pivotable between the raised position and a parallel extending position where the second arm extends forward from the first arm in parallel to the first arm;
the camera head is pivotable between a juxtaposed position where the camera head is juxtaposed to the second arm and a position where the camera head is raised from the second arm;
when the document camera is to be folded, the first arm is set to the parallel extending position, the second arm is set to the juxtaposed position and the camera head is set to the juxtaposed position;
when the document camera has been folded, an upper surface of the first arm, an upper surface of the second arm and an upper surface of the camera head are substantially coplanar;
the first arm is provided with a second arm housing recess in which the second arm is housed;
the second arm is provided with a camera head housing recess in which the camera head is housed; and
when the document camera has been folded, the second arm is laid in the second arm housing recess, and the camera head is laid in the camera head housing recess.

2. The document camera according to claim 1, wherein:
each of the first and second arms has a pair of right and left arm pieces and a bottom connecting the right and left arm pieces and is formed into a generally U-shaped plane;
the second arm housing recess is defined by both arm pieces and the bottom of the first arm; and
the camera head housing recess is defined by both arm pieces and the bottom of the second arm.

3. The document camera according to claim 2, wherein when the second arm is at the juxtaposed position,
the second arm fits in the second arm housing recess, intervening between the right and left arm pieces of the first arm, and
upper surfaces of the right and left arm pieces are coplanar to the upper surface of the first arm.

4. The document camera according to claim 3, wherein the first arm has a lower surface that is at an opposite side from the upper surface of the first arm,
the second arm has a lower surface that is at an opposite side from the upper surface of the second arm, and
when the second arm is at the parallel extending position, the upper surface of the first arm and the lower surface of the second arm are coplanar, and the lower surface of the first arm and the upper surface of the second arm are coplanar.

5. The document camera according to claim 2, wherein when the camera head is at the juxtaposed position,
the camera head fits in the camera head housing recess, intervening between the right and left arm pieces of the second arm, and
upper surfaces of the right and left arm pieces are coplanar to the upper surface of the second arm.

6. The document camera according to claim 5, wherein the second arm has a lower surface that is at an opposite side from the upper surface of the second arm,
the camera head has a lower surface that is at an opposite side from the upper surface of the camera head, the lower surface on which an imaging lens (16a) to capture an image is equipped, and when the camera head is at the juxtaposed position, the lower surface of the second arm and the lower surface of the camera head are coplanar.

7. The document camera according to claim 1, further comprising:
a second arm stopper provided on the first arm for preventing the second arm located at the laid position from pivoting in a direction reverse to a pivoting direction of the first arm when the first arm is caused to pivot from the parallel extending position to the raised position; and
a camera head stopper provided on the second arm for preventing the camera head located at the laid position from pivoting in a direction reverse to a pivoting direction of the second arm when the second arm is caused to pivot from the laid position to the raised position.

8. The document camera according to claim 1, wherein the base has a width substantially equal to a width of the first arm.

9. The document camera according to claim 1, wherein the base includes an attaching unit which detachably attach the base to a base mounting surface.

10. The document camera according to claim 1, further comprising a support plate provided on a bottom of the base so as to extend forward from the front end of the base.

11. The document camera according to claim 1, wherein a gap is defined between a distal end of the camera head and the bottom of the U-shaped second arm when the document camera is folded, and a finger is insertable into the gap.

12. The document camera according to claim 1, further comprising a third arm interposed between the second arm and the camera head, wherein:
the third arm is assembled to the second arm so as be pivotable in the front-back direction; and
the camera head is assembled to the third arm so as to be pivotable in a right-left direction, which is perpendicular to the front-back direction, with respect to the third arm.

13. The document camera according to claim 12, further comprising a fourth arm interposed between the third arm and the camera head, wherein the camera head is assembled to a distal end of the fourth arm so as be pivotable about a pivot axis by a pivot shaft extending in a longitudinal direction with respect to the fourth arm.

* * * * *